United States Patent
Guo et al.

(10) Patent No.: US 10,938,320 B2
(45) Date of Patent: Mar. 2, 2021

(54) METHOD FOR MINIMIZING DC CAPACITANCE FOR CASCADE MULTILEVEL CONVERTER

(71) Applicants: SHENK ELECTRIC INC., Shijiazhuang (CN); Yanshan University, Qinhuangdao (CN)

(72) Inventors: Xiaoqiang Guo, Qinhuangdao (CN); Lichong Wang, Shijiazhuang (CN); Hao Ding, Qinhuangdao (CN); Chaozhe Wang, Qinhuangdao (CN); Zhigang Lu, Qinhuangdao (CN); Baocheng Wang, Qinhuangdao (CN)

(73) Assignees: SHENK ELECTRIC INC., Shijiazhuang (CN); Yanshan University, Qinhuangdao (CN)

( * ) Notice: Subject to any disclaimer, the term of this patent is extended or adjusted under 35 U.S.C. 154(b) by 0 days.

(21) Appl. No.: 16/901,170

(22) Filed: Jun. 15, 2020

(65) Prior Publication Data
US 2020/0403528 A1   Dec. 24, 2020

(30) Foreign Application Priority Data

Jun. 24, 2019   (CN) .......................... 2019 1 05478506

(51) Int. Cl.
*H02M 7/49* (2007.01)
*H02M 7/48* (2007.01)
(Continued)

(52) U.S. Cl.
CPC .............. *H02M 7/49* (2013.01); *H02M 7/483* (2013.01); *H02M 2001/007* (2013.01); *H02M 2007/4818* (2013.01); *H02M 2007/4835* (2013.01)

(58) Field of Classification Search
CPC ........... H02M 2007/4835; H02M 7/49; H02M 2001/007; H02M 7/483; H02M 2007/4818
See application file for complete search history.

(56) References Cited

U.S. PATENT DOCUMENTS

| 9,621,072 | B2* | 4/2017 | Bernet ................. H02M 7/483 |
| 2009/0102436 | A1* | 4/2009 | Escobar Valderrama .................... H02J 3/1857 323/207 |
| 2016/0308357 | A1* | 10/2016 | Yuan ...................... H02M 1/12 |

FOREIGN PATENT DOCUMENTS

| CN | 102158112 A | 8/2011 |
| CN | 103986357 A | 8/2014 |

(Continued)

OTHER PUBLICATIONS

Stefan P. Engel, Control of the Modular Multi-Level Converter for Minimized Cell Capacitance, IEEE (Proceedings of the 2011 14th European Conference on Power Electronics and Applications), (Year: 2011).*

*Primary Examiner* — Alex Torres-Rivera
(74) *Attorney, Agent, or Firm* — IPro, PLLC

(57) ABSTRACT

A method for minimizing DC capacitance of a cascade multilevel converter is provided. On the basis of balancing of capacitor voltages, the method estimates instantaneous value of the DC side capacitor voltages in a circuit through an energy conservation law, and uses a proportional resonance controller to control a grid-connected current to realize adjustment of the grid-connected current without static difference, such that the cascade multilevel converter can operate in a small capacitance mode, the system volume is greatly reduced, the system cost is reduced, the control is easy to be implemented, and the capacitor voltage is free from overshoot and the system has a better rapidity.

2 Claims, 5 Drawing Sheets

(51) Int. Cl.
*H02M 7/483* (2007.01)
*H02M 1/00* (2006.01)

(56) References Cited

FOREIGN PATENT DOCUMENTS

| | | |
|---|---|---|
| CN | 104485830 A | 4/2015 |
| CN | 107026474 A | 8/2017 |
| CN | 107609283 A | 1/2018 |
| CN | 107769597 A | 3/2018 |
| JP | 2013027260 A | 2/2013 |

\* cited by examiner

METHOD FOR MINIMIZING DC CAPACITANCE FOR CASCADE MULTILEVEL CONVERTER

TECHNICAL FIELD

The present disclosure belongs to the field of power electronics technology, and specifically relates to a method for minimizing DC (direct current) capacitance of a cascade multilevel converter.

BACKGROUND

A cascade H-bridge multilevel converter generally includes filter inductors and N H-bridges, each of the H-bridge consists of four switches $S_{n1}$-$S_{n4}$, (n=1, 2, ... N) and DC side capacitance C. The cascade H-bridge multilevel converter is wildly used in the industrial filed because of its advantages, such as modularity, reducing switching losses while maintaining an excellent harmonic performance, no step-up transformer required in a medium voltage application. When the cascade H-bridge multilevel converter is applied to a cascade multilevel converter, floating capacitors are required on the DC side to supply power for the system. For the general cascade multilevel converter system, for ensuring the stability of capacitor voltage on the DC side, and under allowance of cost and volume, the larger capacitance value may be generally chosen as possible to reduce voltage ripples formed on the DC side resulting from reactive power exchange with the grid. Generally, electrolytic capacitors can meet the requirements of the large capacitance; however, electrolytic capacitors have short service life and relatively low withstand voltage, thus, the industry usually uses thin film capacitors. As compared with the electrolytic capacitors, the thin film capacitors have lower power density and higher cost, as a result, in the case of the same capacitance value, use of the thin film capacitors will increase the cost and volume of the system, that is, the larger the capacitance value, the higher the capacitor cost and the larger the capacitor volume. As increasing demand for system power density in the industrial field, a small capacitance cascade multilevel converter system is urgently needed.

SUMMARY

A technical problem to be solved by the present disclosure is to provide a method for minimizing DC capacitance of a cascade multilevel converter, for reducing a DC side floating capacitance value of a cascade H-bridge multilevel converter. The cascade multilevel converter includes filter inductors L and N H-bridges, each of the H-bridge consists of four switches $S_{n1}$-$S_{n4}$, (n=1, 2, ... N) and a DC side capacitance C.

In order to solve the above technical problem, the present disclosure discloses method for minimizing DC capacitance of a cascade multilevel converter, where in the method comprises steps of:

step 1: measuring an initial value $V_{n0}$(n=1, 2, ..., N) of each of capacitor voltages of H-bridges of the cascade multilevel converter and a grid-connected current $i_g$, and then using an reactive current detection algorithm, to obtain an reactive current given signal $I_{qref}$;

step 2: when the capacitor voltages are balanced, instantaneous estimation values of the capacitor voltages of N H-bridges are equal, that is, $V_{c1}=V_{c2}=V_{c3}=...=V_{cN}$, the instantaneous estimation values $V_{cn}$(n=1, 2, ..., N) of the capacitor voltages of the H-bridges can be obtained on the basis of a formula (1):

$$V_{cn} = \sqrt{\frac{CV_{10}^2 + CV_{20}^2 + \cdots + CV_{N0}^2 + Li_g^2 + 2\int_{t_0}^{t} i_g v_g dt}{NC}} \quad (1)$$

in the formula (1), C is a capacitance value of each of the H-bridges in a cascade multilevel converter system; $V_{n0}$ (n=1, 2, ..., N) is the initial value of the capacitor voltage of each of the H-bridges in the cascade multilevel converter system; L is a total inductance value in the cascade multilevel converter system; $i_g$ is the grid-connected current value in the cascade multilevel converter system; $v_g$ is a grid voltage value in the cascade multilevel converter system; $t_0$ is an initial time in the cascade multilevel converter system and t is a current time in the cascade multilevel converter system.

using the energy conservation law, an equation can be listed according to the cascade multilevel converter system:

$$\frac{1}{2}CV_{c1}^2 + \frac{1}{2}CV_{c2}^2 + \ldots + \frac{1}{2}CV_{cN}^2 =$$
$$\frac{1}{2}CV_{10}^2 + \frac{1}{2}CV_{20}^2 + \ldots + \frac{1}{2}CV_{N0}^2 + \frac{1}{2}(L_1+L_2)i_g^2 + \int_{t_0}^{t} i_g v_g dt$$

the formula (1) can be obtained from the equation;

Step 3: multiplying the instantaneous estimation value $V_{cn}$(n=1, 2, ..., N) of the capacitor voltages of each of the H-bridges by the total number N of the H-bridges to obtain $N^*V_{cn}$, as a reference signal of a voltage control loop proportional resonance (PR) controller, and a sum of the instantaneous values of the capacitor voltages of each of the H-bridges: $\Sigma u_{cn}=u_{c1}+u_{c2}+u_{c3}+\ldots+u_{cN}$ is used as a negative feedback signal of the voltage control loop PR controller; subtracting the negative feedback signal $u_{c1}+u_{c2}+u_{c3}+\ldots+u_{cN}$ from the reference signal $N^*V_{cn}$ is an input of the voltage control loop PR controller;

multiplying an output result of the voltage control loop PR controller by a logic signal g to obtain an output signal $I_{dref}$ of the voltage control loop PR controller; when the grid voltage and the grid-connected current are in the same direction, that is, when the grid voltage and the grid-connected current are both positive or the grid voltage and the grid-connected current are both negative, the logic signal g is 1; and when the grid voltage and the grid-connected current are in the opposite direction, that is, when the grid voltage is positive and the grid current is negative, or the grid voltage is negative and the grid current is positive, the logic signal g is −1.

Step 4: subtracting the signal $I_{dref}$ of the voltage control loop PR controller from the reactive current given signal $I_{qref}$, and then subtracting the grid-connected current $i_g$ as the input of the current control loop PR controller, to obtain a modulation signal $u_{ref}$ output by the current control loop PR controller;

Step 5, dividing a sum $\Sigma u_{cn}$ of the instantaneous values of the capacitor voltages of the N H-bridges by the total number N of the H-bridges to obtain an average value $$\frac{\sum u_{cn}}{N}$$

of the instantaneous values of the capacitor voltages, and subtracting the sum of instantaneous values $\Sigma u_{cn}$ of the capacitor voltages of the H-bridges from the $$\frac{\sum u_{cn}}{N}$$

as an input signal of a capacitor voltage balancing control loop proportional integral (PI) controller;

dividing the grid-connected current $i_g$ by a peak value of the grid-connected current to obtain an adjustment signal S;

multiplying the output signal of the capacitor voltage balancing control loop PI controller by the adjustment signal S to obtain a fine adjustment signal $\Delta u_{ref-n}$.

Step 6: adding the modulation signal $u_{ref}$ output by the current control loop PR controller to the fine adjustment signal $\Delta u_{ref-n}$ output by the capacitor voltage balancing control loop PI controller to obtain a modulation signal $u_{ref-n}$ which generates a driving signal for controlling switches of the H-bridges through a PWM generator to control on-off of the switches.

Preferably, a transfer function of the PR controller is $$k_p + \frac{k_R s}{s^2 + \omega_0^2},$$

in which $k_p$ is a proportional amplification coefficient, $k_R$ is a resonance coefficient and $\omega_0$ is a resonance angular frequency.

The controlling method as above mentioned, in the case of compensating the reactive current, synchronous fluctuation of the capacitor voltage and the grid voltage can be realized to improve the fluctuation range of the capacitor voltage while ensuring that the DC side capacitor voltage is always larger than the grid voltage, so as to reduce the capacitance value.

Compared with the prior art, the present disclosure has beneficial effects below:

1) according to the controlling method, the capacitor voltage transient process is free from the overshoot, the transient process is short, the system has good rapidity, and the system can normally operate under a condition that the DC side capacitance value is relatively small;

2) the controlling method has a simple principle and thereby easy to implement.

DETAILED DESCRIPTION

Specific embodiments of the present disclosure will be further described in detail with reference to the accompanying drawings.

Figure 1:
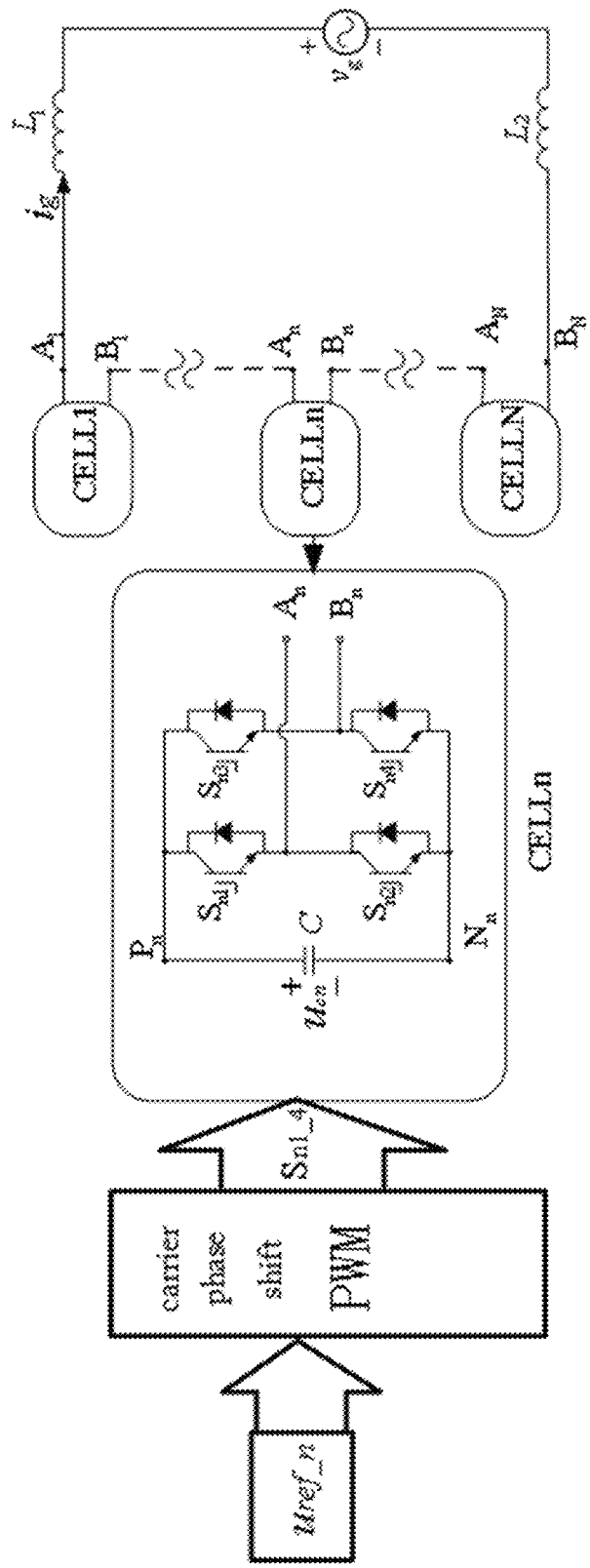
FIG. 1 is a schematic view of a cascade multilevel converter according to an embodiment of the present disclosure.

In this embodiment, under a situation of MATLAB/Simulink2013a, a method for minimizing DC capacitance of the cascade multilevel converter as provided in the present disclosure is simulated. As shown in FIG. 1, the cascade multilevel converter includes an inductance L and N H-bridges, wherein each of the H-bridges includes a DC side capacitance C and four switches $S_{n1}$-$S_{n1}$, $S_{n1}$-$S_{n4}$ (n=1, 2, . . . N). In the simulation of this embodiment, N=3, that is, there are three H-bridges to be used, simulation parameters are shown in table 1 below:

TABLE 1

| Simulation Parameters | |
|---|---|
| Initial value of the DC side capacitor voltage | 100 V |
| Filter inductor | 5 mH |
| Peak value of the grid voltage | 100 V |
| Peak value of the grid-connected current | 10 A |
| Switching frequency | 10 kHz |
| Capacitance value of the H-Bridge | 60 μF |

Figure 2:
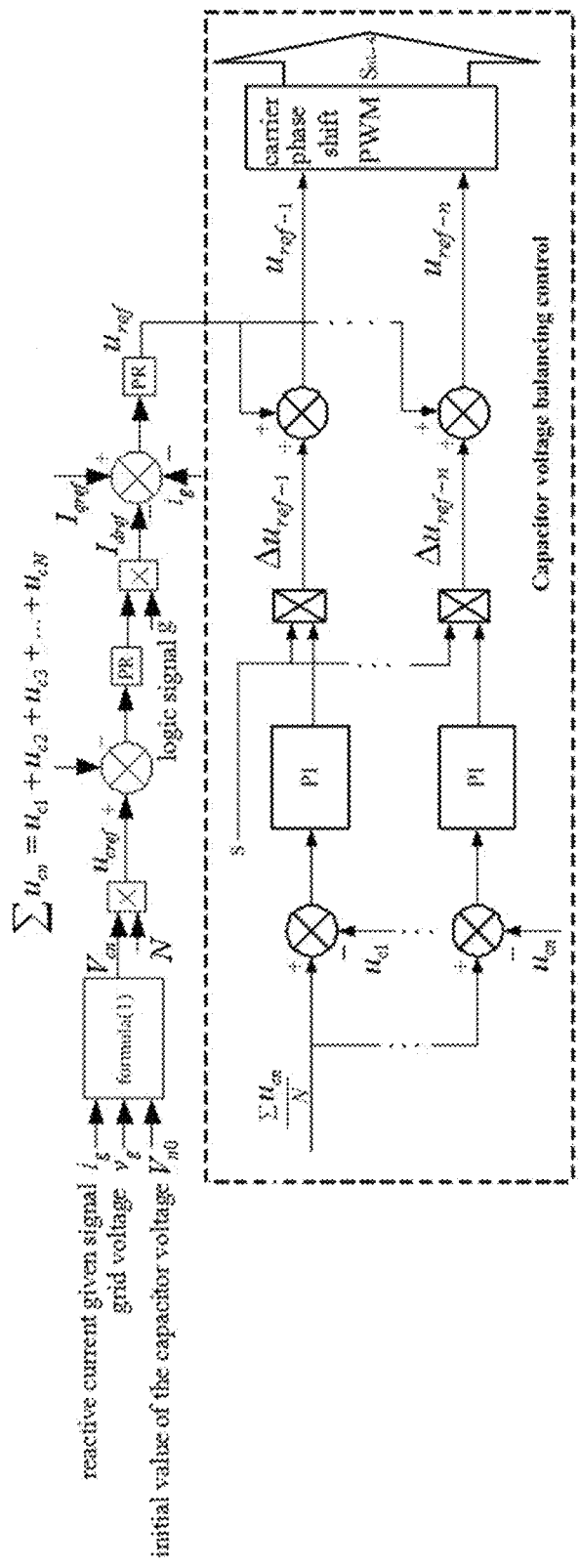
FIG. 2 is a schematic view of a control method in FIG. 1.

FIG. 2 is a schematic view of a control method of the present disclosure, in which a capacitor voltage balancing control loop PI (Proportional-Integral) controller, a voltage PR (Proportional-resonant)controller, a current PR controller, and a carrier phase shift PWM;

Step 1: setting an initial value $V_{n0}$(n=1, 2, 3) of the capacitor voltage of H-bridge to be 100 V, and an reactive current given signal $I_{qref}$=10 cos(θ)(θ=0~2π);

Step 2: on the basis of the capacitor voltage balancing, instantaneous estimation values of the capacitor voltage of the three H-bridges are equal, that is, $V_{c1}$=$V_{c2}$=$V_{c3}$; the instantaneous estimation value $V_{cn}$(n=1, 2, 3) of the capacitor voltage of each of the H-bridges can be obtained according to the formula (1);

Step 3: multiplying the instantaneous estimation value $V_{cn}$(n=1, 2, 3) of each of the capacitor voltages of the H-bridges by total numbers 3 of the H-bridges to obtain 3*$V_{cn}$, as a reference signal of the voltage control loop PR controller, a sum of the instantaneous estimation value of the capacitor values of each of the H-bridges is $\Sigma u_{cn}$=$u_{c1}$+$u_{c2}$+$u_{c3}$, as a feedback signal of the voltage control loop PR controller;

subtracting the feedback signal $u_{c1}$+$u_{c2}$+$u_{c3}$ from the reference signal 3*$V_{cn}$(n=1, 2, 3) as input of the voltage control loop PR controller;

multiplying the output of the voltage control loop PR controller by a logic signal g to obtain an output signal $I_{dref}$ of the voltage control loop PR controller; when the grid voltage and the grid-connected current are in the same direction, the logic signal g is 1; and when the grid voltage and the grid-connected current are in the opposite directions, the logic signal g is −1;

a transfer function of the PR controller is $$k_p + \frac{k_R s}{s^2 + \omega_0^2},$$

wherein $k_p$ is a proportional amplification coefficient, $k_R$ is a resonance coefficient, $\omega_0$ is a resonance angular frequency, the parameters of the voltage control loop PR controller are $k_p=0.01$, $k_R=0.8$ respectively; and the parameters of the current control loop PR controller are $k_p=0.5$, $k_R=200$ respectively;

Step 4: subtracting the output signal $I_{dref}$ of the voltage control loop PR controller from the reactive current given signal $I_{qref}$, and then subtracting the grid-connected current $i_g$ as an input of the current control loop PR controller, and the output of the current control loop PR controller is a modulation signal $u_{ref}$;

Step 5: dividing a sum $\Sigma u_{cn}$ of the capacitor voltage instantaneous values of the three H-bridges by the total number N of the H-bridges to obtain an average value $$\frac{\sum u_{cn}}{3}(n=1,2,3)$$

of the capacitor voltage instantaneous values, and subtracting the capacitor voltage instantaneous value $u_{cn}$ of each of the H-bridges from $$\frac{\sum u_{cn}}{3}(n=1,2,3)$$

as the input signal of the capacitor voltage balancing control loop PI controller;

dividing the grid-connected current $i_g$ by the peak value of the grid-connected current to obtain an adjustment signal; multiplying the output signal of the capacitor voltage balancing control loop PI controller by the adjustment signal S to obtain a fine adjustment signal $\Delta u_{ref-n}$;

Step 6: adding the modulation signal $u_{ref}$ output by the current control loop PR controller to the fine adjustment signal $\Delta u_{ref-n}$ output by the capacitor voltage balancing control loop to obtain the modulation signal $u_{ref-n}$ of the cascade multilevel converter system, and then generating a drive signal by the PWM generator to drive the switches. In this embodiment, the carrier phase shift modulation is used to generate the drive signal, to be simply controlled and easily realized digitally.

Figure 3:
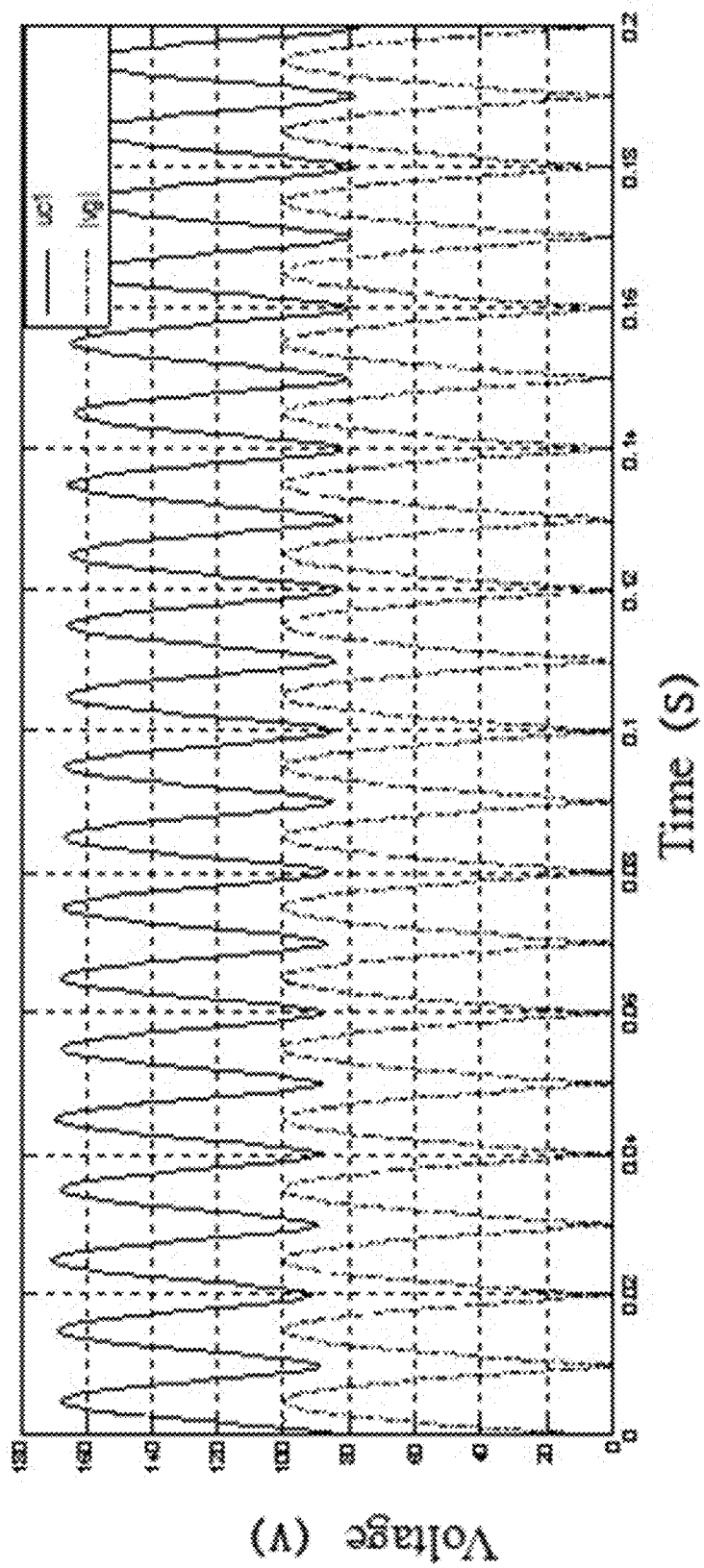
FIG. 3 is a waveform view of absolute values of a H-bridge DC side capacitor voltage and a grid according to the present disclosure.
Figure 4:
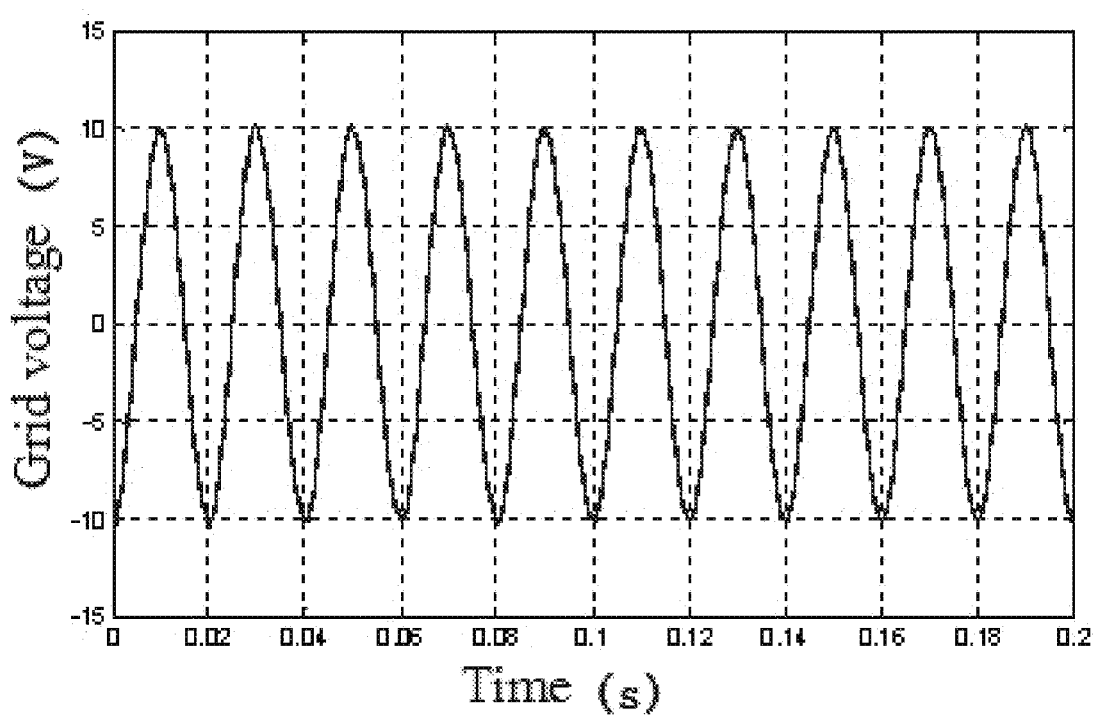
FIG. 4 is a schematic waveform view of grid current according to the present disclosure.

Under the situation of the capacitor voltage balancing, a waveform view of the absolute values of the capacitor voltage on the DC side of the H-bridges and the grid voltage is shown in FIG. 3, and a waveform view of the grid current is shown in FIG. 4.

Figure 5:
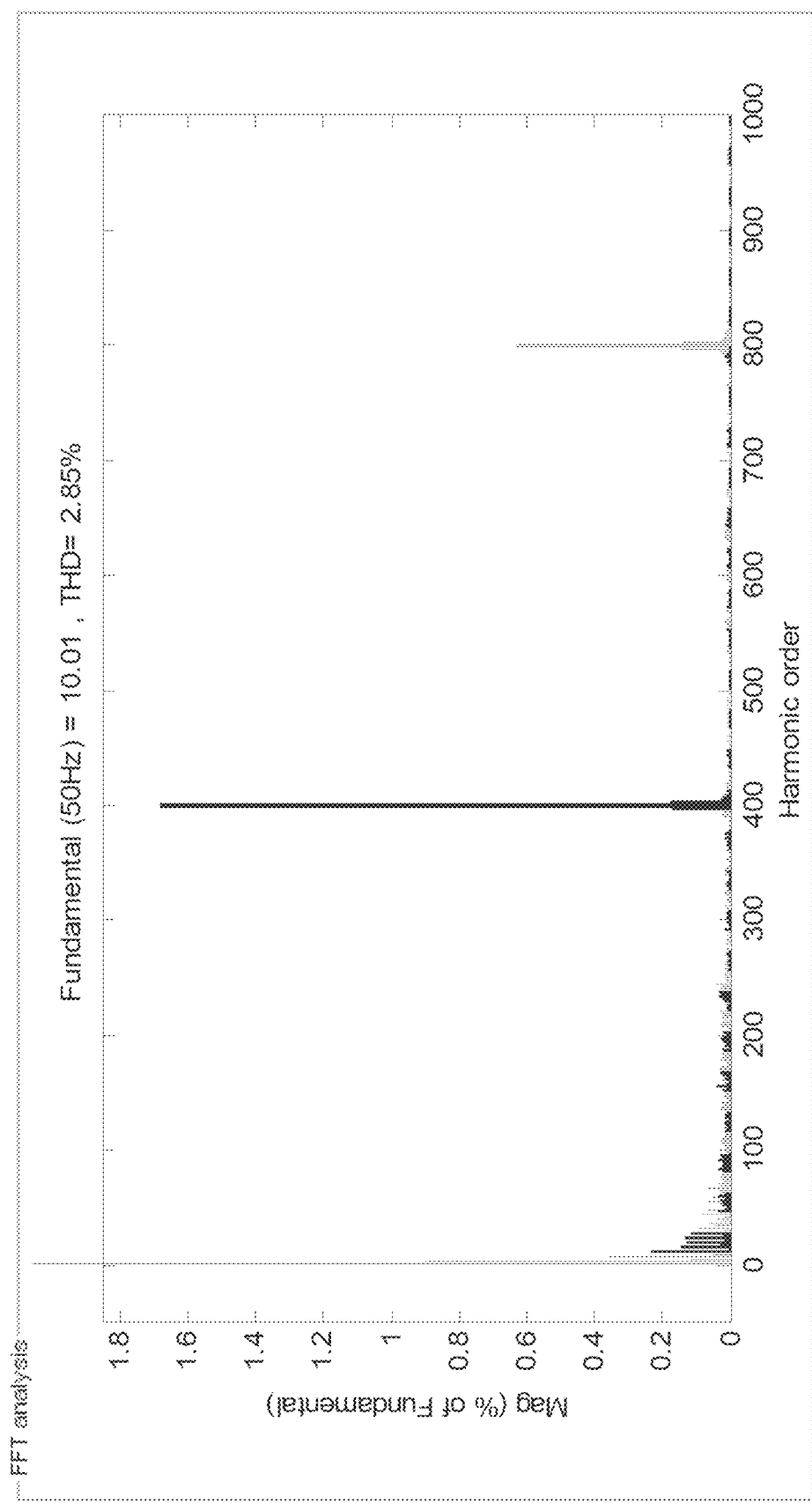
FIG. 5 is a schematic view of FFT analysis of the grid current in FIG. 4 according to the present disclosure.

FFT analysis is performed on the grid current in FIG. 4, as a result shown in FIG. 5, the grid current THD=2.85% complies with the national power quality standard 14549-1993.

In the case of the same parameters, through the theoretical calculation, the traditional solution of controlling the average value of the capacitor voltage is adopted, and the required capacitance value is about 1.4 mF. In the solution as provided by the present disclosure, the capacitance value is 60 μF, which can meet the system requirement, obviously reduce the capacitance value, and the capacitor voltage is free from overshoot and the system has a better rapidity.

In summary, the present disclosure provides a method for minimizing DC capacitance of a cascade multilevel converter, in which the proportional resonance controller is used for controlling the grid-connected current, to realize adjustment of the grid-connected current without static difference, such that the cascade multilevel converter can be operated in a small capacitance mode, thus greatly reducing cost of the system and easily controlling, and the capacitor voltage is free from overshoot and the system has better rapidity. In addition, compensation current range of the system can meet the system requirements when the system is operated in the small capacitance mode, and the output current quality and capacitor voltage control both can reach an ideal control target.

Finally, it should be noted that the above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify the technical solution described in the foregoing embodiments or equivalently substituting some or all of the technical features; however, these modifications or substitutions do not cause the corresponding technical solutions to substantively depart from the scope of the technical solutions of various embodiments of the present disclosure.

What is claimed is:

1. A method for minimizing DC capacitance of a cascade multilevel converter, where in the method comprises steps of:

step 1: measuring an initial value $V_{n0}(n=1, 2, \ldots, N)$ of each of capacitor voltages of H-bridges and a grid-connected current ($i_g$), and then using a reactive current detection algorithm, to obtain a reactive current given signal ($I_{qref}$), N is a finite integer number;

step 2: as balancing the capacitor voltages, instantaneous estimation values of the capacitor voltages of N H-bridges are equal, that is, $V_{c1}=V_{c2}=V_{c3}=\ldots=V_{cN}$, an expression for the instantaneous estimation values of the capacitor voltages of the H-bridges is:

$$V_{cn} = \sqrt{\frac{CV_{10}^2 + CV_{20}^2 + \cdots + CV_{N0}^2 + Li_g^2 + 2\int_{t_0}^{t} i_g v_g dt}{NC}}$$

calculating to obtain a value of the instantaneous estimation value $V_{cn}(n=1, 2, \ldots, N)$ of the capacitor voltage of the H-bridges;

in the expression for the instantaneous estimation values of the capacitor voltage of the H-bridges, C is a capacitance value of each of the H-bridges in a cascade multilevel converter system; $V_{10}, V_{20}, \ldots, V_{N0}$ is the initial value $V_{n0}(n=1, 2, \ldots, N)$ of the capacitor voltage of each of the H-bridges measured in the step 1; L is a total inductance value in the cascade multilevel converter system; $i_g$ is the grid-connected current value in the cascade multilevel converter system; $v_g$ is a grid voltage value in the cascade multilevel converter system; $t_0$ is an initial time in the cascade multilevel converter system and t is a current time in the cascade multilevel converter system;

Step 3: multiplying $V_{cn}(n=1, 2, \ldots, N)$ by the total number N of the H-bridges to obtain $N*V_{cn}$, $\Sigma u_{cn}=u_{c1}+u_{c2}+u_{c3}+\ldots+u_{cN}$ is a sum of the instantaneous values of the capacitor voltages of the H-bridges, and subtracting $\Sigma u_{cn}$ from $N*V_{cn}$ as an input of a voltage control loop PR controller;

when the grid voltage and the grid-connected current are in the same direction, a logic signal (g) is 1; and when the grid voltage and the grid-connected current are in the opposite direction, the logic signal (g) is −1;

multiplying the output of the voltage control loop PR controller by the logic signal (g) to obtain a signal ($I_{dref}$);

Step 4: subtracting the signal ($I_{dref}$) from the reactive current given signal ($I_{qref}$), and then subtracting the grid-connected current ($i_g$) as the input of the current control loop PR controller, and to be output as a modulation signal ($u_{ref}$);

Step 5, dividing a sum $\Sigma u_{cn}$ of the instantaneous values of the capacitor voltages of the N H-bridges by the total number N of the H-bridges to obtain an average value $$\left(\frac{\sum u_{cn}}{N}\right)$$

of the instantaneous values of the capacitor voltages, and subtracting the instantaneous values ($u_{cn}$) of the capacitor voltages of the H-bridges from the $$\frac{\sum u_{cn}}{N}$$

as an input signal of a capacitor voltage balancing control loop PI controller;

dividing the grid-connected current ($i_g$) by a peak value of the grid-connected current to obtain an adjustment signal (S);

multiplying the output signal of the capacitor voltage balancing control loop PI controller by the adjustment signal S to obtain a fine adjustment signal ($\Delta u_{ref\text{-}n}$); and Step 6: adding the modulation signal ($u_{ref}$) output by the current control loop PR controller to the fine adjustment signal ($\Delta u_{ref\text{-}n}$) output by the capacitor voltage balancing control loop PI controller to obtain a modulation signal ($u_{ref\text{-}n}$), which generates a driving signal for controlling switches of the H-bridges through a PWM generator to control on-off of the switches.

2. The method for minimizing DC capacitance of a cascade multilevel converter according to claim 1, wherein a transfer function of the PR controller is $$k_p + \frac{k_R s}{s^2 + \omega_0^2},$$

in which $k_p$ is a proportional amplification coefficient, $k_R$ is a resonance coefficient and $\omega_0$ is a resonance angular frequency.

* * * * *